United States Patent
Batra et al.

(10) Patent No.: US 12,266,489 B2
(45) Date of Patent: Apr. 1, 2025

(54) ELECTRICAL NETWORK

(71) Applicant: Siemens Aktiengesellschaft, Munich (DE)

(72) Inventors: Shivansh Batra, Offenbach am Main (DE); Thomas Beckert, Nuremberg (DE); Michael Hein, Kuemmersbruck (DE); Yi Zhu, Kuemmersbruck (DE)

(73) Assignee: Siemens Aktiengesellschaft, Munich (DE)

( * ) Notice: Subject to any disclaimer, the term of this patent is extended or adjusted under 35 U.S.C. 154(b) by 156 days.

(21) Appl. No.: 17/599,067

(22) PCT Filed: Sep. 13, 2019

(86) PCT No.: PCT/EP2019/074542
§ 371 (c)(1),
(2) Date: Sep. 28, 2021

(87) PCT Pub. No.: WO2020/200494
PCT Pub. Date: Oct. 8, 2020

(65) Prior Publication Data
US 2022/0200274 A1  Jun. 23, 2022

(30) Foreign Application Priority Data

Mar. 29, 2019 (WO) ................ PCT/CN2019/080553
Mar. 29, 2019 (WO) ................ PCT/CN2019/080554
Mar. 29, 2019 (WO) ................ PCT/CN2019/080558

(51) Int. Cl.
*H02H 3/087* (2006.01)
*H01H 9/54* (2006.01)
(Continued)

(52) U.S. Cl.
CPC .......... *H01H 33/596* (2013.01); *H01H 9/542* (2013.01); *H02H 1/0007* (2013.01);
(Continued)

(58) Field of Classification Search
CPC .... H01H 33/596; H02H 1/0007; H02H 3/087; H02H 3/202; H02H 7/1252; H02H 7/222;
(Continued)

(56) References Cited

U.S. PATENT DOCUMENTS 5,654,859 A * 8/1997 Shi ........................... H02J 9/00
361/100
8,803,358 B2   8/2014 Hafner et al.
(Continued)

FOREIGN PATENT DOCUMENTS

CA      2910979 A1    1/2015
CN    101741057 A    6/2010
(Continued)

OTHER PUBLICATIONS

U.S. Appl. No. 17/599,055, filed Sep. 28, 2021.
(Continued)

*Primary Examiner* — Levi Gannon
(74) *Attorney, Agent, or Firm* — Harness, Dickey & Pierce, P.L.C.

(57) ABSTRACT

An electrical network is equipped with feed-in devices, loads, a distribution grid arranged therebetween, at least one semiconductor switch, and at least one electromechanical switch for separating a feed-in device or a load in the event of a fault. The feed-in devices and loads are arranged in groups which are connected together by a busbar and paired semiconductor switches. Each feed-in device and load can be separated from the grid by an electromechanical switch in the event of a fault, and the individual groups of feed-in devices and loads can be separated from one another by the semiconductor switches in the event of a fault in order to prevent cross currents on the busbar.

15 Claims, 2 Drawing Sheets

(51) Int. Cl.
- *H01H 33/59* (2006.01)
- *H02H 1/00* (2006.01)
- *H02H 7/125* (2006.01)
- *H02H 7/22* (2006.01)
- *H02H 7/26* (2006.01)
- *H02H 9/00* (2006.01)
- *H02J 1/10* (2006.01)
- *H02J 1/12* (2006.01)

(52) U.S. Cl.
CPC .......... *H02H 3/087* (2013.01); *H02H 7/1252* (2013.01); *H02H 7/1257* (2013.01); *H02H 7/222* (2013.01); *H02H 7/268* (2013.01); *H02H 9/001* (2013.01); *H02J 1/10* (2013.01); *H02J 1/12* (2013.01); *H01H 2009/544* (2013.01)

(58) Field of Classification Search
CPC . H02H 7/268; H02H 9/001; H02J 1/10; H02J 1/12; H02J 7/34
See application file for complete search history.

(56) References Cited

U.S. PATENT DOCUMENTS

| | | | |
|---|---|---|---|
| 9,042,146 | B2 | 5/2015 | Weiss et al. |
| 9,184,003 | B2 | 11/2015 | Crane |
| 9,525,284 | B2 | 12/2016 | Kim et al. |
| 9,698,589 | B1 | 7/2017 | Leyh |
| 9,755,433 | B2 | 9/2017 | Xu et al. |
| 9,853,536 | B2 | 12/2017 | Xu et al. |
| 10,693,293 | B2 | 6/2020 | Qi et al. |
| 10,944,254 | B2 | 3/2021 | Shi et al. |
| 2004/0027734 | A1 | 2/2004 | Fairfax et al. |
| 2005/0052798 | A1 | 3/2005 | Grisoni |
| 2007/0014062 | A1* | 1/2007 | Fischer ............... H02H 1/0007 361/62 |
| 2007/0077830 | A1 | 4/2007 | Rzadki et al. |
| 2010/0118450 | A1 | 5/2010 | Ritzinger et al. |
| 2010/0231042 | A1* | 9/2010 | Weale ............... H02J 13/00028 307/38 |
| 2010/0292853 | A1 | 11/2010 | McDonnell |
| 2011/0127853 | A1 | 6/2011 | Fujita et al. |
| 2011/0298283 | A1* | 12/2011 | Sannino ............... H02J 4/00 307/38 |
| 2012/0218676 | A1 | 8/2012 | Demetriades et al. |
| 2013/0021708 | A1 | 1/2013 | Demetriades et al. |
| 2013/0106184 | A1 | 5/2013 | Hafner et al. |
| 2013/0121051 | A1 | 5/2013 | Weiss et al. |
| 2013/0270902 | A1 | 10/2013 | Andersen et al. |
| 2013/0307444 | A1* | 11/2013 | Settemsdal ............... H02J 3/322 318/139 |
| 2013/0314828 | A1 | 11/2013 | Chen et al. |
| 2014/0063669 | A1 | 3/2014 | Lundqvist |
| 2014/0078622 | A1 | 3/2014 | Crane |
| 2014/0254050 | A1 | 9/2014 | Haines et al. |
| 2014/0361621 | A1* | 12/2014 | Lindtjorn ............... H02J 1/06 307/38 |
| 2015/0014277 | A1 | 1/2015 | Theisen et al. |
| 2015/0137595 | A1 | 5/2015 | Xu et al. |
| 2016/0152151 | A1 | 6/2016 | Yang et al. |
| 2016/0172838 | A1 | 6/2016 | Luebke et al. |
| 2016/0190791 | A1 | 6/2016 | Sim |
| 2016/0336734 | A1 | 11/2016 | Lee et al. |
| 2017/0054291 | A1* | 2/2017 | Qi ............... H02H 3/025 |
| 2017/0098931 | A1 | 4/2017 | Gerdinand et al. |
| 2017/0170663 | A1 | 6/2017 | Christ et al. |
| 2017/0373498 | A1* | 12/2017 | Haugan ............... H02H 3/32 |
| 2018/0034258 | A1* | 2/2018 | Schweitzer, III ............... H02H 3/05 |
| 2018/0159315 | A1* | 6/2018 | Aagesen ............... H02H 7/28 |
| 2018/0240627 | A1 | 8/2018 | Matsuo et al. |
| 2018/0241200 | A1* | 8/2018 | Hu ............... H02H 3/162 |
| 2019/0020193 | A1 | 1/2019 | Cao et al. |
| 2019/0190258 | A1 | 6/2019 | Shi et al. |
| 2019/0267842 | A1* | 8/2019 | Richter ............... H01F 27/245 |
| 2019/0334340 | A1 | 10/2019 | Niehoff |
| 2019/0353689 | A1 | 11/2019 | Hauer |
| 2020/0119548 | A1* | 4/2020 | Haugan ............... H02J 1/10 |
| 2021/0339692 | A1* | 11/2021 | Miro Bargallo .... B60R 16/0232 |
| 2021/0359632 | A1 | 11/2021 | Valasek et al. |
| 2022/0020544 | A1 | 1/2022 | Zhu |
| 2022/0166214 | A1 | 5/2022 | Batra et al. |
| 2022/0172914 | A1 | 6/2022 | Batra et al. |

FOREIGN PATENT DOCUMENTS

| | | |
|---|---|---|
| CN | 202305715 U | 7/2012 |
| CN | 102696087 A | 9/2012 |
| CN | 102959818 A | 3/2013 |
| CN | 103457246 A | 12/2013 |
| CN | 203352192 U | 12/2013 |
| CN | 103762546 A | 4/2014 |
| CN | 104242229 A | 12/2014 |
| CN | 104518564 A | 4/2015 |
| CN | 104617573 A | 5/2015 |
| CN | 104638618 A | 5/2015 |
| CN | 105162093 A | 12/2015 |
| CN | 105207178 A | 12/2015 |
| CN | 105305372 A | 2/2016 |
| CN | 105322514 A | 2/2016 |
| CN | 105529677 A | 4/2016 |
| CN | 105743058 A | 7/2016 |
| CN | 105762775 A | 7/2016 |
| CN | 106099878 A | 11/2016 |
| CN | 106253243 A | 12/2016 |
| CN | 106486965 A | 3/2017 |
| CN | 106663557 A | 5/2017 |
| CN | 106786403 A | 5/2017 |
| CN | 206442309 U | 8/2017 |
| CN | 107210603 A | 9/2017 |
| CN | 107276045 A | 10/2017 |
| CN | 107565524 A | 1/2018 |
| CN | 107768195 A | 3/2018 |
| CN | 107810583 A | 3/2018 |
| CN | 108092253 A | 5/2018 |
| CN | 108152633 A | 6/2018 |
| CN | 108448548 A | 8/2018 |
| CN | 109193661 A | 1/2019 |
| CN | 109494693 A | 3/2019 |
| CN | 109494695 A | 3/2019 |
| EP | 2523331 A1 | 11/2012 |
| EP | 2634885 A1 | 9/2013 |
| EP | 3109964 A1 | 12/2016 |
| EP | 3379674 A1 | 9/2018 |
| EP | 3477809 A1 | 5/2019 |
| KR | 20160035845 A | 4/2016 |
| WO | WO-2005049418 A2 | 6/2005 |
| WO | WO-2012/123015 A1 | 9/2012 |
| WO | WO-2013/131782 A1 | 9/2013 |
| WO | WO-2018/028247 A1 | 2/2018 |
| WO | WO-2018/109161 A1 | 6/2018 |

OTHER PUBLICATIONS

U.S. Appl. No. 17/599,103, filed Sep. 28, 2021.
U.S. Appl. No. 17/599,076, filed Sep. 28, 2021.
U.S. Appl. No. 17/599,119, filed Sep. 28, 2021.
PCT International Search Report and Written Opinion of International Searching Authority mailed Dec. 10, 2019 in PCT International Application No. PCT/EP2019/074545 filed Sep. 13, 2019.
PCT International Search Report and Written Opinion of International Searching Authority mailed Dec. 10, 2019 in PCT International Application No. PCT/EP2019/074539 filed Sep. 13, 2019.
ABB Substation Automation Products and Systems, "REF 541, 543, 545 Protection, Monitoring and Control Technical Reference Manual Part 1, General," 1 MRS750527-MUM, Sep. 29, 1997.
PCT International Search Report and Written Opinion of International Searching Authority mailed Dec. 10, 2019 in PCT International Application No. PCT/EP2019/074541 filed Sep. 13, 2019.

(56) References Cited

OTHER PUBLICATIONS

PCT International Search Report and Written Opinion of International Searching Authority mailed Dec. 9, 2019 in PCT International Application No. PCT/EP2019/074544 filed Sep. 13, 2019.
PCT International Search Report and Written Opinion of International Searching Authority mailed Dec. 6, 2019 in PCT International Application No. PCT/EP2019/074542 filed Sep. 13, 2019.
Lin Wenfu:; "Electrical Operation of Power Units"; pp. 356-358; China Water & Power Press, Mar. 2007.

* cited by examiner

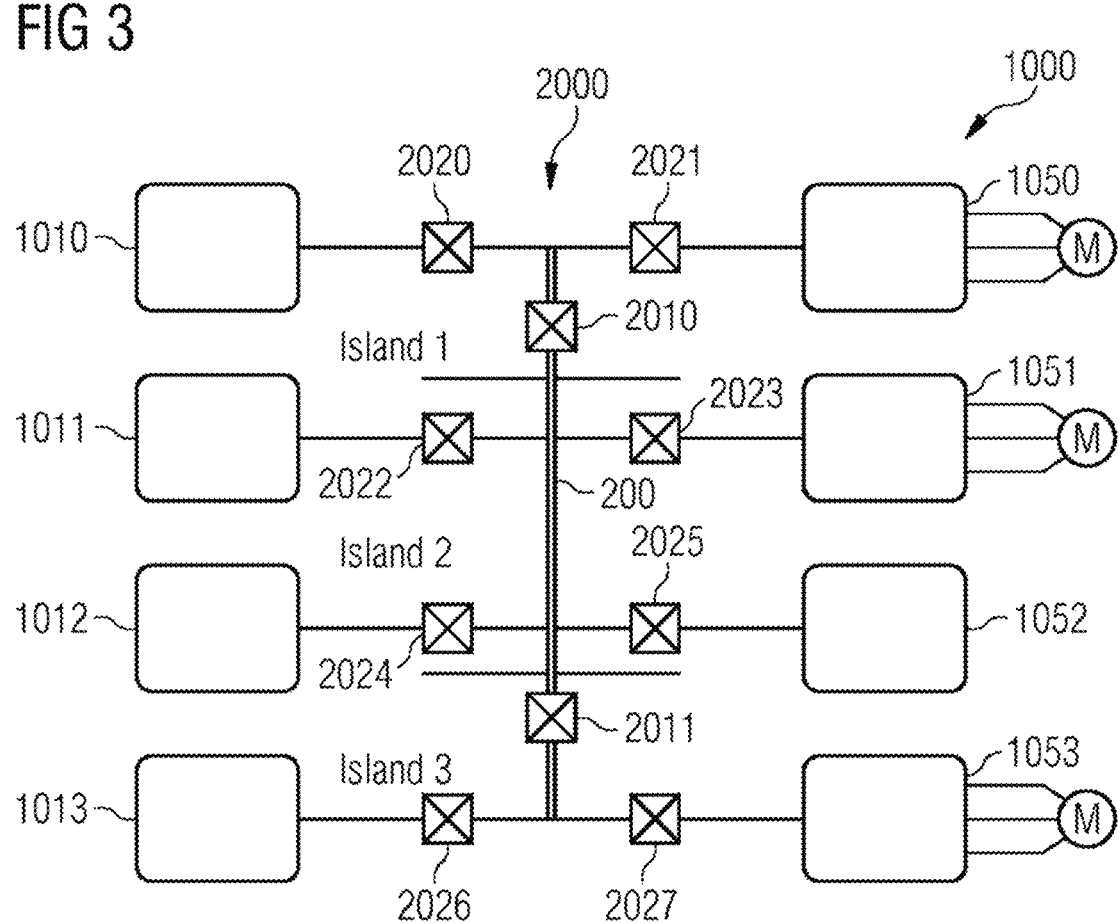

ELECTRICAL NETWORK

CROSS-REFERENCE TO RELATED APPLICATIONS

This application is the National Phase under 35 U.S.C. § 371 of PCT International Application No. PCT/EP2019/074542, which has an international filing date of Sep. 13, 2019, and which claims priority to PCT International Application No. PCT/CN2019/080553 filed Mar. 29, 2019, PCT International Application No. PCT/CN2019/080554 filed Mar. 29, 2019, and PCT International Application No. PCT/CN2019/080558 filed Mar. 29, 2019, the entire contents of each of which are incorporated herein by reference.

FIELD

Example embodiments of the present application relate to an electrical network.

BACKGROUND

DC (direct current) networks include feed-in devices and loads. By way of example, FIG. 1 illustrates such a DC network having feed-in devices 1010; 1011; 1012; 1013 and loads 1050; 1051; 1052; 1053. Such DC networks are increasingly popular since conversion losses can be minimized. The energy efficiency is increased by virtue of it being necessary to convert from alternating current to direct current just once for all motors instead of performing a conversion for each motor.

It is also advantageous that the losses in DC distribution networks are very low as the frequency is zero and there are no impedance losses, only resistive losses. A further advantage of DC networks is that there is no skin effect on account of the zero frequency; it is therefore possible to use cables with smaller cross sections at lower costs, for example.

Any type of feed-in device can be used in a typical DC network. For example, renewable energy sources such as photovoltaics or wind turbines can also be used as feed-in devices or batteries or flywheels and AC network connections with AC/DC converters can be used as backup resources. Each feed-in device uses a converter, either AC/DC or DC/DC for different DC voltages. In order to obtain a virtually constant direct current without fluctuations, DC link capacitors are typically used directly after the converters on the DC side. Each converter is thus typically connected to a DC link capacitor; such a system is referred to as a DC link.

The AC/DC converter in a DC network can be either of unidirectional (rectifier) or bidirectional (for example in active front end technology) construction. Uncontrolled rectifiers in the unidirectional mode typically include diodes and active front ends (AFE), which include IGBTs and diodes, with the result that a current cannot flow from the DC side to the AC side when the active front end (AFE) is switched off, which is prevented by freewheeling diodes. The fact that current can flow from the AC side to the DC side is not prevented by the diode arrangement when the DC side has a lower voltage than the AC side. In the case of an active front end (AFE) in the switched-off state, this therefore corresponds to a three-phase uncontrolled rectifier.

The feed-in devices are typically connected to a busbar 200, according to the illustration in FIG. 1. The loads are supplied with power from the feed-in devices via a common busbar.

Electric motors that require an AC supply are generally considered as electrical loads, for which reason extra DC/AC converters are required for each motor on the load side. Each converter is connected in turn to a DC link capacitor in order to obtain a constant voltage. Further capacitors are thus located upstream of the DC/AC converters (inverters).

As illustrated, there are many capacitors present in a DC network, arranged both on the feed-in, but also on the load side. In order to start a DC network, these capacitors have to be charged to the distribution voltage of the network, since otherwise high currents flow like in the event of short circuits. A resistor is typically used to charge the capacitors in order to limit the current, which in turn means an increase in the charging time. During normal operation, the capacitors function as filters and do not cause any problems. However, as soon as a fault arises in the DC network, the capacitors are discharged and discharge all of their energy in a time period of ms (milliseconds). A resulting current in the order of magnitude of hundreds of kA (kilo amperes) can therefore lead to damage in the DC network.

A further problem is what are known as LCR oscillations, caused by inductive, capacitive and resistive elements in the network. In the event of a fault, typically the voltage falls suddenly and the current rises sharply, but a negative voltage in the DC system is observed for a short time on account of the LCR oscillations. The oscillations are caused by leakage inductances in the cables. Inductance and ohmic resistance are typically introduced into the system via cables and capacitances are typically introduced via DC link capacitors. In the event of a fault, the capacitors are discharged and the voltage across the capacitors becomes negative on account of the LCR oscillations. This therefore results in the state that after the capacitors are discharged there are approximately zero volts on the AC side of the AC/DC converter and a negative voltage on the DC side on account of the LCR oscillations. A high current therefore flows through the converter diodes in order to recharge the capacitors, which can lead to destruction of said diodes.

In FIG. 1, protective devices 2020; 2021; 2022; 2023; 2024; 2025; 2026; 2027 are therefore arranged at the feed-in devices 1010; 1011; 1012; 1013 and loads 1050; 1051; 1052; 1053 between these and the busbar 200. These protective devices may be a combination of fuses or electrical switches. In DC networks with various sources, a typical protective device cannot trigger quickly enough in the event of a fault. The capacitors discharge despite conventional fuses and electrical switches. Diodes of the converters are typically damaged as a result.

In addition, if the fault is present at a small load with cables with a low cross section, this cable can also be damaged. However, the greatest problem is that in the event of a fault the discharge current comes from different capacitors at the same time. The high summation current leads to cables being permanently damaged.

SUMMARY

Example embodiments of the present application provide an electrical network that mitigates or even overcomes at least one of the mentioned problems of DC networks in the event of a fault.

At least one example embodiment, according to the invention, provides an electrical network. Advantageous configurations of the electrical network are specified in the claims.

At least one example embodiment of the electrical network is equipped with feed-in devices, loads and a distribution network, which is arranged therebetween, and has at least one semiconductor switch, and has at least one electromechanical switch for isolating a feed-in device or a load in the event of a fault. The feed-in devices and loads are arranged in groups, which are connected to one another via a busbar and associated semiconductor switches. A respective feed-in device and loads can each be disconnected from the network via an electromechanical switch in the event of a fault, and the individual groups of feed-in devices and loads can be disconnected from one another via the semiconductor switches in the event of a fault in order to prevent cross currents on the busbar.

According to at least one example embodiment, the individual groups of feed-in devices and loads make possible a system with a very high degree of reliability. In the event of a fault, this fault can be isolated from the network and the rest of the network can continue to be operated. It is likewise prevented that a discharge of the DC link capacitor of other feed-in devices can occur. Lower costs also result from the use of relatively few semiconductor switches arranged on the busbar. In the case of the capacitors of the disconnected groups being recharged, the semiconductor switches can be used as current limiters. In this case, the semiconductor switches can be operated temporarily in the active range as controlled resistor or in a pulsed manner.

In a further configuration, one of the groups of feed-in devices and loads includes one feed-in device and one load.

In a further configuration, one of the groups of feed-in devices and loads includes two feed-in devices and two loads.

In one configuration, in the event of a fault, after an electromechanical switch has been triggered, the group in which the fault has arisen and the electromechanical switch has been triggered is recharged by a group without a fault through the switching of a semiconductor switch that is arranged between said two groups.

In a further configuration, the semiconductor switch that is arranged between said two groups is used as a current limiter during recharging. In this case, the semiconductor switch can be operated temporarily in the active range as a controlled resistor or in a pulsed manner. As an alternative, a resistor arranged between said two groups is used as a current limiter during recharging.

In a further configuration, the feed-in devices and loads are distributed across the groups in such a way that each group can provide enough energy for the loads of said group by way of the feed-in devices of said group.

In a further configuration, the feed-in devices and loads are distributed across the groups in such a way that each group can provide enough energy to supply adjacent groups by way of the feed-in devices of said group.

In a further configuration, the feed-in devices and loads are distributed across the groups in such a way that high-availability loads are arranged in groups that have two adjacent groups.

In one configuration, the feed-in devices and loads are distributed across the groups in such a way that sensitive loads are arranged in an additional group, which in turn is formed as a subgroup in another group.

In a further configuration, this additional group is electrically connected to the other group as a subgroup via a semiconductor switch.

BRIEF DESCRIPTION OF THE DRAWINGS

The above-described properties, features and advantages of this invention and the manner in which they are achieved will become clearer and more distinctly comprehensible in connection with the following description of the embodiments which are explained in more detail in connection with the figures, in which:

FIG. 3: shows an electrical network, according to at least one example embodiment of the invention, having feed-in devices and loads, wherein the feed-in devices and loads are arranged in groups.

DETAILED DESCRIPTION

Figure 1:
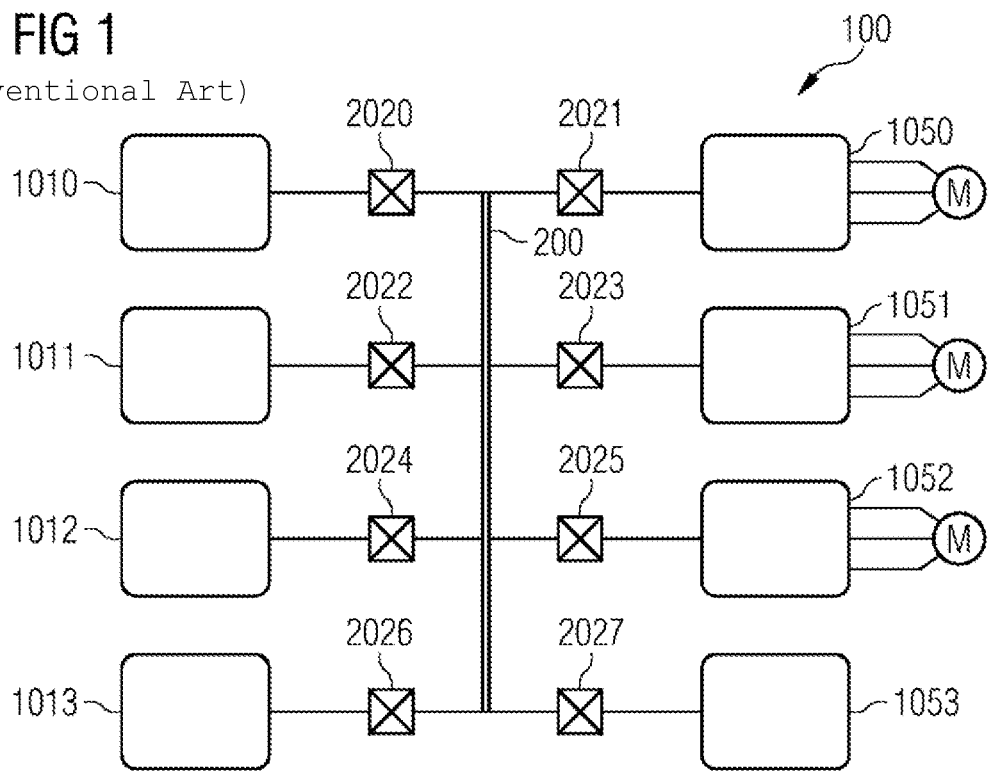
FIG. 1: shows a conventional electrical DC network having feed-in devices and loads.
Figure 2:
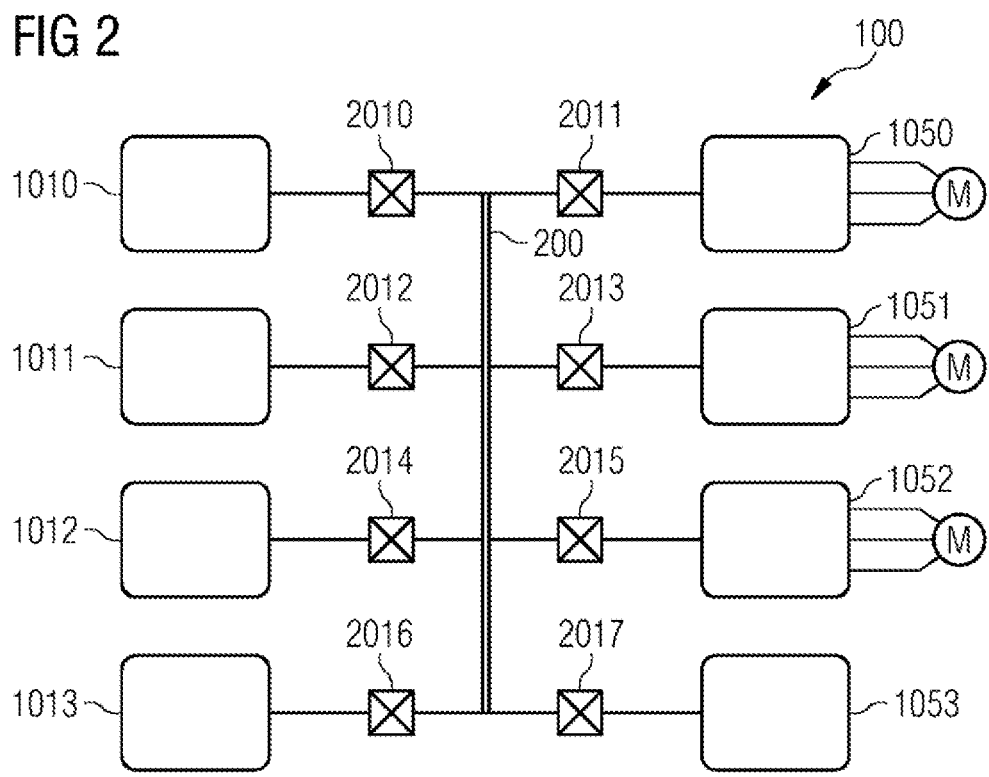
FIG. 2: shows a DC network having feed-in devices and loads and semiconductor switches, according to at least one example embodiment of the invention.

At least one example embodiment of the electrical network is equipped with feed-in devices, loads and a distribution network, which is arranged therebetween, and has at least one semiconductor switch, and has at least one electromechanical switch for isolating a feed-in device or a load in the event of a fault. The feed-in devices and loads are arranged in groups, which are connected to one another via a busbar and associated semiconductor switches. A respective feed-in device and loads can each be disconnected from the network via an electromechanical switch in the event of a fault, and the individual groups of feed-in devices and loads can be disconnected from one another via the semiconductor switches in the event of a fault in order to prevent cross currents on the busbar.

According to at least one example embodiment, the individual groups of feed-in devices and loads make possible a system with a very high degree of reliability. In the event of a fault, this fault can be isolated from the network and the rest of the network can continue to be operated. It is likewise prevented that a discharge of the DC link capacitor of other feed-in devices can occur. Lower costs also result from the use of relatively few semiconductor switches arranged on the busbar. In the case of the capacitors of the disconnected groups being recharged, the semiconductor switches can be used as current limiters. In this case, the semiconductor switches can be operated temporarily in the active range as controlled resistor or in a pulsed manner.

In a further configuration, one of the groups of feed-in devices and loads includes one feed-in device and one load.

In a further configuration, one of the groups of feed-in devices and loads includes two feed-in devices and two loads.

In one configuration, in the event of a fault, after an electromechanical switch has been triggered, the group in which the fault has arisen and the electromechanical switch has been triggered is recharged by a group without a fault through the switching of a semiconductor switch that is arranged between said two groups.

In a further configuration, the semiconductor switch that is arranged between said two groups is used as a current limiter during recharging. In this case, the semiconductor switch can be operated temporarily in the active range as a controlled resistor or in a pulsed manner. As an alternative, a resistor arranged between said two groups is used as a current limiter during recharging.

In a further configuration, the feed-in devices and loads are distributed across the groups in such a way that each group can provide enough energy for the loads of said group by way of the feed-in devices of said group.

In a further configuration, the feed-in devices and loads are distributed across the groups in such a way that each group can provide enough energy to supply adjacent groups by way of the feed-in devices of said group.

In a further configuration, the feed-in devices and loads are distributed across the groups in such a way that high-availability loads are arranged in groups that have two adjacent groups.

In one configuration, the feed-in devices and loads are distributed across the groups in such a way that sensitive loads are arranged in an additional group, which in turn is formed as a subgroup in another group.

In a further configuration, this additional group is electrically connected to the other group as a subgroup via a semiconductor switch.

FIG. 3 illustrates an electrical network 1000 according to at least one example embodiment of the invention. The electrical network 1000 comprises feed-in devices 1010; 1011; 1012; 1013, loads 1050; 1051; 1052; 1053 and a distribution network 2000, which is arranged therebetween. The distribution network 2000 further comprises electromechanical switches 2020; 2021; 2022; 2023; 2024; 2025; 2026; 2027. The electromechanical switches 2020; 2021; 2022; 2023; 2024; 2025; 2026; 2027 are arranged in such a way that the feed-in devices 1010; 1011; 1012; 1013 or the loads 1050; 1051; 1052; 1053 can be isolated from a busbar 200 in the event of a fault. The various feed-in devices 1010; 1011; 1012; 1013 and loads 1050; 1051; 1052; 1053 are electrically connected to one another via the busbar 200.

The feed-in devices 1010; 1011; 1012; 1013 and loads 1050; 1051; 1052; 1053 are arranged in groups. For example, a group 1 is formed by the feed-in device 1010 and the load 1050. The feed-in device 1010 is connected to the busbar 200 via the electromechanical switch 2020, the load 1050 via the electromechanical switch 2021.

A second group is formed by the feed-in devices 1011; 1012 and loads 1051; 1052. Feed-in device 1011 is electrically connected to the busbar 200 via the electromechanical switch 2022, feed-in device 1012 via the electromechanical switch 2024 and load 1051 via the electromechanical switch 2023 and load 1052 via the electromechanical switch 2025. Group 1 formed by feed-in device 1010 and load 1050 is connected to group 2 composed of feed-in devices 1011; 1012 and loads 1051; 1052 via the semiconductor switch 2010.

FIG. 3 illustrates a third group including the feed-in device 1013 and the load 1053. Feed-in device 1013 is connected to the busbar 200 via the electromechanical switch 2026, load 1053 via the electromechanical switch 2027. The third group composed of feed-in device 1013 and load 1053 is electrically connected to group 2 composed of feed-in device 1011; 1012 and loads 1051; 1052 via the semiconductor switch 2011.

The electromechanical switches bring about the effect that in the event of a fault the respectively associated feed-in devices 1010; 1011; 1012; 1013 and loads 1050; 1051; 1052; 1053 can be disconnected from the network 1000. The individual groups of feed-in devices 1010; 1011; 1012; 1013 and loads 1050; 1051; 1052; 1053 can likewise be isolated from one another via the semiconductor switches 2010; 2011 in the event of a fault in order to prevent cross currents on the busbar 200.

The semiconductor switches 2010; 2011 used in the electrical network 1000, according to at least one example embodiment of the invention, can be produced based on silicon (Si), silicon carbide (SiC) or gallium nitride (GaN).

The electrical network 1000, according to at least one example embodiment of the invention, can comprise groups with a different number of feed-in devices and loads. For example, one group can include one feed-in device and one load, such as for example group 1 composed of feed-in device 1010 and load 1050 and group 3 composed of feed-in device 1013 and load 1053 in FIG. 3.

Groups can also include two feed-in devices and two loads, such as for example in group 2 composed of feed-in devices 1011; 1012 and loads 1051; 1052 illustrated in FIG. 3.

Groups respectively of more than two feed-in devices and loads and composed of a different number of feed-in devices or loads are conceivable.

In the event of a fault on the part of the feed-in devices or the loads, the associated electromechanical switch triggers. The group is likewise isolated from the other group via the semiconductor switch 2010; 2011, with the result that on the one hand no cross currents can flow on the busbar 200 and on the other hand the group not affected by the fault can continue to be operated as normal. If the fault is now eliminated, the group can return to the network. To this end, the capacitors on the feed-in devices or load side have to be charged. This can be done by a group without a fault by switching on the semiconductor switch 2010; 2011 that is arranged between said two groups again. This semiconductor switch 2010; 2011 arranged between said two groups is used as a current limiter during recharging. In this case, the semiconductor switch can be operated temporarily in the active range as a controlled resistor or in a pulsed manner. In addition, a resistor, which is used as a current limiter during recharging, can be arranged at the semiconductor switch 2010; 2011.

In order that the concept of disconnecting or dividing feed-in devices and loads into group in the event of a fault forms autonomous groups, the feed-in devices and loads should be distributed across the groups in such a way that each group can provide enough energy for the loads of said group by way of the feed-in devices of said group.

To recharge a group that is isolated from the network via semiconductor switches 2010; 2011 in the event of a fault, the feed-in devices and loads should be distributed across the groups in such a way that each group can provide enough energy to supply adjacent groups by way of the feed-in devices of said group.

In the case of high-availability loads, which where possible ought not to be isolated from the network, these should be distributed across the groups in such a way that the high-availability loads are arranged in groups that have two adjacent groups. High-availability loads can therefore be fed by possibly different sources.

Sensitive loads, such as for example welding robots, can be arranged in an additional group, which in turn is formed as a subgroup in another group. These additional groups can in turn be electrically connected to the other group as a subgroup via a semiconductor switch 2010; 2011.

Semiconductor switches 2010; 2011 divide the busbar 200 into three groups according to the illustration in FIG. 3. Each cable connection via the busbar 200 is safeguarded via an electromechanical switch because these are more cost-effective than semiconductor switches, for example. The switching time or reaction time of the electromechanical switch is in the order of approximately 10 ms (milliseconds). The DC network is therefore divided into small, independent groups, which are connected to one another via semiconductor switches 2010; 2011.

The electrical network 1000, according to at least one example embodiment of the invention, makes it possible to produce groups with different grades of protection. Each group is connected to one other or to other groups via a semiconductor switch 2010; 2011. In the event of a fault in one group, semiconductor switches 2010; 2011 ensure rapid isolation within 10 μs (microseconds) of this group from the rest of the electrical network 1000, with the result that large parts of the electrical network 1000 can continue to be operated during the fault event.

Within a group in which the fault has arisen, electromagnetic switches are used to isolate the fault. After the fault has been disconnected via the electromagnetic switch, the loads can be connected again and the group with the fault can be recharged via a power manager. In order to recharge the capacitors, either the semiconductor switches 2010; 2011 can be used as current limiters or additional resistors can be used as current limiters.

The division of the groups should be carried out under the following boundary conditions. Each group should provide as much energy from their feed-in device(s) so that at least the group's own loads can be operated, with the result that this group is independent of other feed-in devices. Furthermore, the feed-in device(s) should have enough reserve energy available in order to supply groups with faults after a fault has been isolated. Loads should likewise be prioritized according to their importance in the isolated state. Loads with a low requirement should be connected to feed-in devices with a small DC link capacitor. High-availability loads should be arranged between two groups in order to have an increased level of redundancy in the electrical network 1000, according to at least one example embodiment of the invention. Sensitive loads should be arranged in additional groups within one group, wherein this additional group is electrically connected to this group as a subgroup via a semiconductor switch. Further groups can in turn be connected using further semiconductor switches.

The electrical network 1000, according to at least one example embodiment of the invention, likewise reduces LCR oscillations. The busbar 200 should be connected directly to an AC/DC converter, such that there is a low inductance present in the event of a fault. This configuration also means that negative voltage can occur only in exceptional cases. The negative voltage can ultimately be prevented by virtue of a resistor or an inductance being connected in series while the capacitor is discharged, with the result that the diodes of the converter are protected. Further protection is possible by virtue of surge diodes being connected in parallel with the DC link capacitor.

The electrical network, according to at least one example embodiment of the invention, makes possible a high degree of system availability on account of the formation of groups that can be operated independently in the event of a fault. A DC link discharge of other feed-in devices is likewise prevented, which makes it possible to relieve cables of load in the event of fault. It is likewise prevented that a discharge of the DC link load from adjacent groups occurs since discharging into a fault is no longer possible. During operation of the electrical network 1000, a low energy loss is produced since only few semiconductor switches 2010; 2011 are used. The semiconductor switches 2010; 2011 are used as current limiters during recharging of the capacitors of disconnected groups after a fault. In this case, the semiconductor switch can be operated temporarily in the active range as a controlled resistor or in a pulsed manner.

The invention claimed is:

1. An electrical network comprising:
   feed-in devices and loads connected to a common busbar, the busbar being directly connected to an AC/DC converter; and
   a distribution network arranged between the feed-in devices and the loads, the distribution network including at least one semiconductor switch connected to the busbar and arranged to control current flow on the busbar, and at least one electromechanical switch to isolate one or more of the feed-in devices or one or more of the loads in the event of a fault, wherein
   the feed-in devices and loads are arranged in groups of the feed-in devices and loads, which are connected to one another via the busbar and associated semiconductor switches,
   each of the feed-in devices and the loads is associated with a separate electromechanical switch from among the at least one electromechanical switch and each of the at least one electromechanical switch is configured to disconnect an associated feed-in device or load from the electrical network in the event of a fault, and
   individual groups of the feed-in devices and loads are configured to be disconnected from one another via the associated semiconductor switches in the event of a fault to prevent cross currents on the busbar, wherein,
   in the event of a fault, after an electromechanical switch has been triggered, a first group in which the fault has arisen and the electromechanical switch that has been triggered is recharged by a second group without a fault through switching of an associated semiconductor switch, from among the associated semiconductor switches, that is arranged between the first group and the second group.

2. The electrical network as claimed in claim 1, wherein at least one of the groups of the feed-in devices and loads includes one feed-in device and one load.

3. The electrical network as claimed in claim 2, wherein the feed-in devices and loads are distributed across the groups of the feed-in devices and loads such that sensitive loads are arranged in an additional group, which is formed as a subgroup in another group.

4. The electrical network as claimed in claim 3, wherein the additional group is electrically connected to the other group as a subgroup via a semiconductor switch.

5. The electrical network as claimed in claim 1, wherein at least one of the groups of the feed-in devices and loads includes two feed-in devices and two loads.

6. The electrical network as claimed in claim 5, wherein the feed-in devices and loads are distributed across the groups such that high availability loads are arranged in groups that have two adjacent groups.

7. The electrical network as claimed in claim 5, wherein the feed-in devices and loads are distributed across the groups of the feed-in devices and loads such that sensitive loads are arranged in an additional group, which is formed as a subgroup in another group.

8. The electrical network as claimed in claim 7, wherein the additional group is electrically connected to the other group as a subgroup via a semiconductor switch.

9. The electrical network as claimed in claim 1, wherein the associated semiconductor switch arranged between the first group and the second group is used as a current limiter during recharging.

10. The electrical network as claimed in claim 9, wherein a resistor, which is used as a current limiter during recharging, is arranged in the associated semiconductor switch between the first group and the second group.

11. The electrical network as claimed in claim 1, wherein the feed-in devices and loads are distributed across the groups of the feed-in devices and loads such that each group provides enough energy for the loads of said group by way of the feed-in devices of said group.

12. The electrical network as claimed in claim 1, wherein the feed-in devices and loads are distributed across the groups of the feed-in devices and loads such that each group provides enough energy to supply adjacent groups by way of the feed-in devices of said group.

13. The electrical network as claimed in claim 1, wherein the feed-in devices and loads are distributed across the groups such that high availability loads are arranged in groups that have two adjacent groups.

14. The electrical network as claimed in claim 1, wherein the feed-in devices and loads are distributed across the groups of the feed-in devices and loads such that sensitive loads are arranged in an additional group, which is formed as a subgroup in another group.

15. The electrical network as claimed in claim 14, wherein the additional group is electrically connected to the other group as a subgroup via a semiconductor switch.

* * * * *